US012718143B2

(12) United States Patent
He et al.

(10) Patent No.: US 12,718,143 B2
(45) Date of Patent: Aug. 25, 2026

(54) TRAINING AND IMPLEMENTING A DATA QUALITY VERIFICATION MODEL TO VALIDATE RECURRING DATA PIPELINES

(71) Applicant: Microsoft Technology Licensing, LLC, Redmond, WA (US)

(72) Inventors: Yeye He, Bellevue, WA (US); Weiwei Cui, Beijing (CN); Song Ge, Beijing (CN); Haidong Zhang, Beijing (CN); Shi Han, Beijing (CN); Dongmei Zhang, Beijing (CN); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1074 days.

(21) Appl. No.: 17/743,219

(22) Filed: May 12, 2022

(65) Prior Publication Data

US 2023/0368068 A1 Nov. 16, 2023

(51) Int. Cl.
*G06N 20/00* (2019.01)

(52) U.S. Cl.
CPC .................................... *G06N 20/00* (2019.01)

(58) Field of Classification Search
CPC .... G06N 20/00; G06F 11/3471; G06F 16/215
See application file for complete search history.

(56) References Cited

U.S. PATENT DOCUMENTS

2012/0158625 A1* 6/2012 Nelke .................... G06N 5/025 706/59
2014/0280193 A1* 9/2014 Cronin ................ G06F 16/2455 707/741
2015/0019912 A1* 1/2015 Darling .............. G06F 11/3684 714/26

(Continued)

FOREIGN PATENT DOCUMENTS

WO 2020178327 A1 9/2020

OTHER PUBLICATIONS

"Deequ: recommended settings", Retrieved from: https://github.com/awslabs/deequ/tree/master/src/main/scala/com/amazon/deequ/suggestions/rules, Retrieved Date: Mar. 2, 2022, 1 Page.

(Continued)

*Primary Examiner* — Yuk Ting Choi
(74) *Attorney, Agent, or Firm* — Ray Quinney & Nebeker P.C.; James Bullough

(57) ABSTRACT

The present disclosure relates to systems, methods, and computer-readable media for training and implementing pipeline error detection models to facilitate automated detection of data quality (DQ) issues within recurring data pipelines. For example, systems described herein involve training a pipeline error detection model by first constructing a plurality of DQ constraints for a recurring data pipeline based on ranges of values observed over a history of pipeline executions. The systems may further train the model to predict DQ issues by synthetically applying data variants to historical executions of the recurring data pipeline or to data (Continued)

pipelines having similar characteristics thereto. Once trained, the pipeline error detection model(s) can be applied to new executions of the data pipeline as they become available to quickly and efficiently predict whether a given execution includes a predicted DQ issue therein.

18 Claims, 7 Drawing Sheets

(56) References Cited

U.S. PATENT DOCUMENTS

| | | | | |
|---|---|---|---|---|
| 2018/0136019 | A1* | 5/2018 | Deshpande | G01D 18/002 707/741 |
| 2020/0034665 | A1* | 1/2020 | Ghanta | G06N 5/04 707/741 |
| 2020/0285997 | A1* | 9/2020 | Bhattacharyya | G06N 7/01 707/741 |
| 2020/0382968 | A1* | 12/2020 | Gupta | H04L 41/145 707/741 |
| 2020/0407769 | A1* | 12/2020 | Tabata | C12Q 1/34 707/741 |
| 2021/0342204 | A1* | 11/2021 | Choudhury | G06F 11/004 707/741 |
| 2022/0083915 | A1* | 3/2022 | Duarte | G06F 18/214 707/741 |

OTHER PUBLICATIONS

"Detect data drift (preview) on datasets", Retrieved from: https://docs.microsoft.com/en-us/azure/machine-learning/how-to-monitor-datasets?tabs=python, Nov. 11, 2021, 17 Pages.

"Get started with Tensorflow Data Validation", Retrieved from: https://web.archive.org/web/20220209032123/https://tensorflow.org/tfx/data_validation/get_started, Feb. 9, 2022, 14 Pages.

Aggarwal, et al., "Outlier Detection for High Dimensional Data", In Proceedings of the ACM SIGMOD international conference on Management of data, May 1, 2001, pp. 37-46.

Basu, et al., "Automatic outlier detection for time series: an application to sensor data", In Journal of Knowledge and Information Systems, vol. 11, Issue 2, Aug. 22, 2006, pp. 137-154.

Ben-Gal, et al., "Outlier Detection", In Journal of Data Mining and Knowledge Discovery Handbook, 2005, 16 Pages.

Breck, et al., "Data Validation for Machine Learning", In Proceedings of the 2nd Machine Learning and Systems, Apr. 15, 2019, 14 Pages.

Breunig, et al., "LOF: identifying density-based local outliers", In Proceedings of the 2000 ACM SIGMOD International Conference on Management of Data, May 16, 2000, pp. 93-104.

Bulmer, Michael George, "Principles of statistics", In Book of Principles of Statistics, 1979, 130 Pages.

Zhou, et al., "SCOPE: parallel databases meet MapReduce", In VLDB Journal vol. 21, Issue 5, Oct. 1, 2012, pp. 611-636.

Caveness, et al., "Tensorflow data validation: Data analysis and validation in continuous ml pipelines", In Proceedings of the ACM SIGMOD International Conference on Management of Data, Jun. 14, 2020, pp. 2793-2796.

Chen, et al., "xgboost: eXtreme Gradient Boosting", In Journal of R Package version, vol. 1, Issue 4, Jan. 4, 2017, 4 Pages.

Cheung, et al., "Lag order and critical values of the augmented Dickey-Fuller test", In Journal of Business & Economic Statistics, vol. 13, Issue 3, Jul. 1, 1995, pp. 277-280.

Cohen, Jacob, "Statistical power analysis for the behavioral sciences", In Journal of Routledge, May 13, 2013, 579 Pages.

Endres, et al., "A new metric for probability distributions", In Journal of IEEE Transactions on Information Theory , vol. 49, Issue 7, Jul. 2003, pp. 1858-1860.

Ferdousi, et al., "Unsupervised outlier detection in time series data", In Proceedings of the 22nd International Conference on Data Engineering Workshops, Apr. 3, 2006, pp. 51-56.

Fienberg, Stephen E., "The use of chi-squared statistics for categorical data problems", In Journal of the Royal Statistical Society: Series B (Methodological), vol. 41, Issue 1, 1979, 30 Pages.

Galhardas, et al., "Declarative data cleaning: Language, model, and algorithms", In Doctoral Dissertation of INRIA, May 24, 2006, 41 Pages.

Swinehart, et al., "Forecast Snapshot: Self-Service Data Preparation", Retrieved from: https://www.gartner.com/en/documents/3204817, Feb. 9, 2016, 3 Pages.

Swami, et al., "Data Sentinel: A Declarative Production-Scale Data Validation Platform", In Proceedings of the IEEE 36th International Conference on Data Engineering, Apr. 20, 2020, pp. 1579-1590.

Hellerstein, Josephm., "Quantitative Data Cleaning for Large Databases", In Journal of United Nations Economic Commission for Europe, Feb. 27, 2008, 42 Pages.

Hodge, et al., "A Survey of Outlier Detection Methodologies", In Journal of Artificial intelligence Review, vol. 22, Issue 2, Oct. 1, 2004, 43 Pages.

Khuller, et al., "The Budgeted Maximum Coverage Problem", In Journal of Information Processing Letters, vol. 70, Issue 1, 1999, 8 Pages.

Liu, et al., "Isolation Forest", In Proceedings of the Eighth IEEE International Conference on Data Mining, Dec. 15, 2008, 10 Pages.

Song, et al., "Auto-Validate: Unsupervised Data Validation Using Data-Domain Patterns Inferred from Data Lakes", In Proceedings of the 2021 International Conference on Management of Data, Jun. 20, 2021, pp. 1678-1691.

Massey, Frank J., "The Kolmogorov-Smirnov Test for Goodness of Fit", In Journal of the American statistical Association, 1951, pp. 68-78.

Scholkopf, et al., "Support Vector Method for Novelty Detection", In Proceedings of Advances in Neural Information Processing Systems, 1999, pp. 584-588.

Polyzotis, et al., "Data management challenges in production machine learning", In Proceedings of the ACM International Conference on Management of Data, May 14, 2017, pp. 1723-1726.

Rahm, et al., "Data Cleaning: Problems and Current Approaches", In Journal of IEEE Data Engineering Bulletin, vol. 23, Issue 4, Dec. 2000, pp. 3-13.

Raman, et al., "Potter's wheel: An Interactive Data Cleaning System", In Proceedings of the 27th International Conference on Very Large Data Bases, Sep. 11, 2001, 10 Pages.

Rubner, et al., "A Metric for Distributions with Applications to Image Databases", In Journal of Sixth IEEE International Conference on Computer Vision, Jan. 7, 1998, 8 Pages.

Schelter, et al., "Automating Large-Scale Data Quality Verification", In Proceedings of the Very Large Data Bases Endowment, Aug. 2018, pp. 1781-1794.

Schelter, "Deequ—Data Quality Validation for Machine Learning Pipelines", In Proceedings of Machine Learning Systems Workshop at the Conference on Neural Information Processing Systems, 2018, 3 Pages.

Schelter, et al., "Differential data quality verification on partitioned data", In Proceedings of the IEEE 35th International Conference on Data Engineering, Apr. 8, 2019, 6 Pages.

Schelter, et al., "Unit testing data with deequ", In Proceedings of the International Conference on Management of Data, Jun. 30, 2019, pp. 1993-1996.

Park, Kun Il, "Fundamentals of probability and stochastic processes with applications to communications", In Journal of Springer, 2018, 277 Pages.

Granger, et al., "An introduction to long-memory time series models and fractional differencing", In Journal of Time Series Analysis, vol. 1, No. 1, 1980, pp. 15-29.

Gupta, et al., "Deep similarity learning for disease prediction", In Journal of Trends in Deep Learning Methodologies, Jan. 1, 2021, pp. 183-206.

Ljung, Greta M, "On outlier detection in time series", In Journal of the Royal Statistical Society: Series B (Methodological), vol. 55, Issue 2, 1993, pp. 559-567.

(56) References Cited

OTHER PUBLICATIONS

Ren, et al., "Time-Series Anomaly Detection Service at Microsoft", In Proceedings of the 25th ACM SIGKDD International Conference on Knowledge Discovery & Data Mining, Aug. 4, 2019, pp. 3009-3017.
"TFDV: recommended settings", Retrieved from: https://www.tensorflow.org/tfx/data_validation/get_started, 2022, 13 pages.
Cantrell, C.D., "Modern Mathematical Methods for Physicists and Engineers", In Book of Cambridge University Press, Oct. 1, 2000, 13 pages.
"International Search Report and Written Opinion Issued in PCT Application No. PCT/US23/017655", Mailed Date: Jul. 14, 2023, 11 Pages.

* cited by examiner 310
320
Pipeline Error Detection Model
DQ Constraint
DQ Constraint Optimizer 120
Model Optimizer 318
DQ Constraint Collection 306
316a
316b
DQ Variant Manager 314
DQ Variant
312

TRAINING AND IMPLEMENTING A DATA QUALITY VERIFICATION MODEL TO VALIDATE RECURRING DATA PIPELINES

BACKGROUND

Recent years have seen a precipitous rise in the use of computing devices (e.g., mobile devices, personal computers, server devices) to create, store, edit, and share data. Indeed, tools and applications for creating and utilizing data pipelines are becoming more and more common. Indeed, data pipelines are widely used in modern enterprises by a wide variety of computing applications. In many instances, these data pipelines are recurring pipelines in which data is periodically refreshed. These recurring data pipelines provide current and updated information that provide ready access to current data when executing a variety of applications.

Due to the recurring nature of recurring data pipelines, data quality errors are a common concern. For example, data quality issues will often creep into recurring pipelines over time for a variety of reasons. As modern enterprises make use of thousands of recurring data pipelines, data quality can become a significant issue, particularly in examples where certain data pipelines are interdependent on one another. Indeed, recurring data pipelines can experience data quality issues as a result of schema drift, sudden increases in null values, changing unit values, changing value standards, and other common issues.

Conventional systems for identifying data quality issues typically involve individuals that manually monitor data pipelines to identify common data quality issues. For example, an individual may monitor a corpus of data pipelines to identify whether certain pipelines experience a change in schema, a sudden change in null values, or other common problem. As an alternative to manual inspection, some conventional systems will create individual and customized programs that are trained to detect data quality issues for specific columns of data. These approaches, however, are generally very inefficient and are not scalable for the increasing number of recurring data pipelines that are becoming available. Indeed, manual inspection can be very expensive and time consuming for the individual tasked with monitoring and inspecting data pipelines. In addition, generating unique or customized programs on a column by column basis can be similarly time-consuming, and becomes inadequate as the number of recurring pipelines continues to grow.

These and other problems exist with regard to identifying data quality issues in recurring data pipelines.

DETAILED DESCRIPTION

Figure 1:
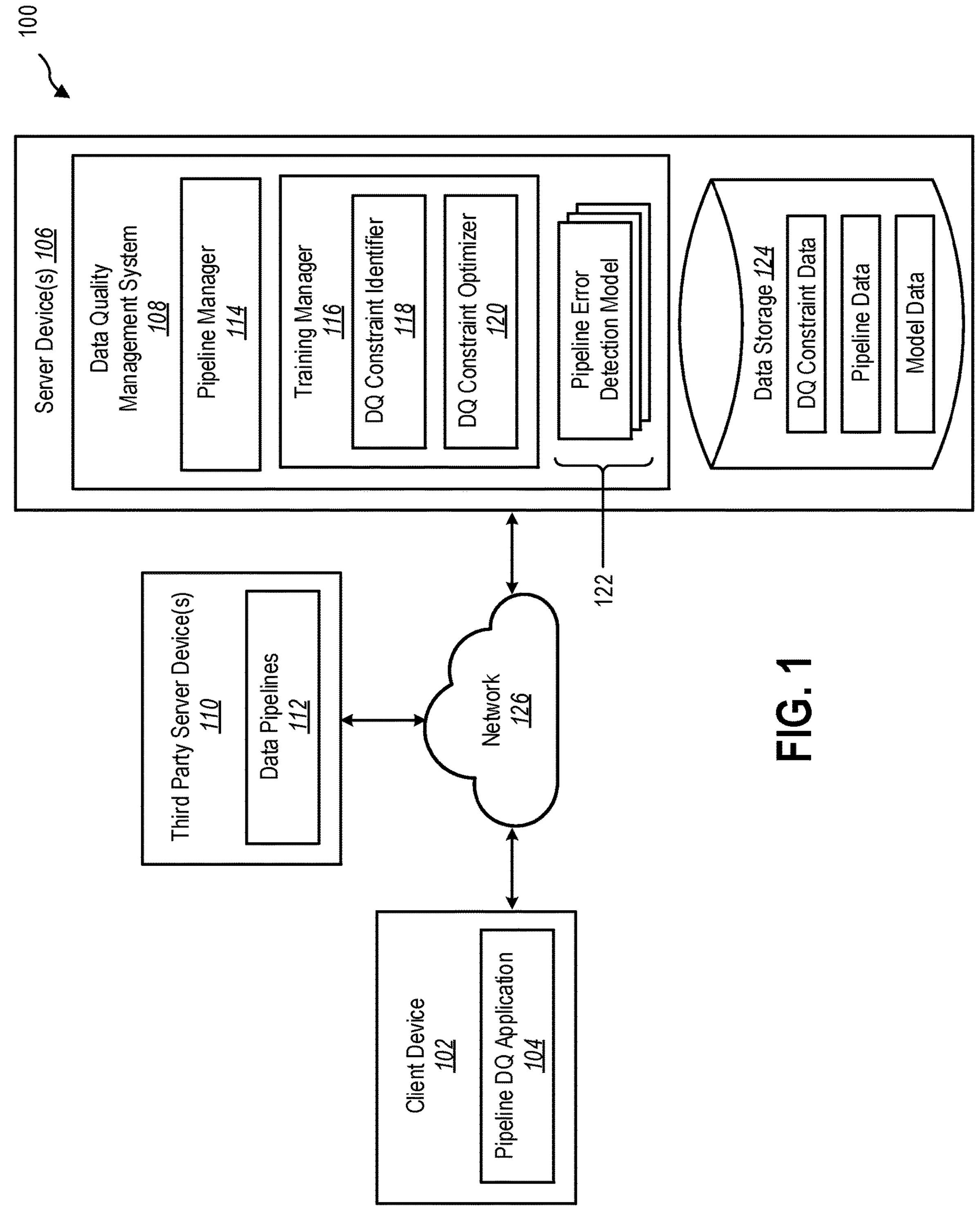
FIG. 1 illustrates an example environment including a data quality management system in accordance with one or more embodiments.

The present disclosure relates to a data quality management system for including features and functionality related to pipeline error detection models for a wide variety of recurring data pipelines. In particular, as will be discussed in further detail below, the data quality management system may train a pipeline error detection model based on a history of executions for a recurring data pipeline. The data quality management system may further apply the trained pipeline error detection model to each current execution of a data pipeline to accurately predict data quality (DQ) errors within the current execution of the data pipeline. As will be discussed in further detail herein, this predicted DQ error in addition to an explanation of the type of DQ issues that a current execution is experiencing can be used in a variety of ways to prevent DQ issues within recurring data pipelines from corrupting various processes and applications that make use of the recurring data pipelines.

As an illustrative example, and as will be discussed in further detail herein, the data quality management system may identify a false positive rate (FPR) threshold associated with a rate of falsely predicting DQ errors within a plurality of recurring data pipelines. The data quality management system may further train a pipeline error detection model to output a prediction indicating whether a given execution of a recurring data pipeline has a DQ error. This may involve determining a set of DQ constraints for a collection of pipelines and determining a subset of relevant DQ constraints for a given pipeline associated with a pipeline execution of interest (e.g., a most recent or current execution for a given data pipeline). The data quality management system may further apply the pipeline error detection model to the current execution of the recurring data pipeline to generate an output indicating a prediction of whether the execution of the recurring data pipeline has experienced a DQ issue between the current execution and any previous executions of the recurring data pipeline.

The present disclosure includes a number of practical applications that provide benefits and/or solve problems associated with identifying DQ errors within a variety of data pipelines. Some non-limiting examples of these benefits will be discussed in further detail below.

For example, the data quality management system provides a number of features related to automating a process whereby a computing device can diagnose and explain predicted DQ errors within a given execution of a recurring data pipeline. In particular, upon receiving an FPR threshold (e.g., user-configured or default FPR threshold), the data quality management system can train a pipeline error detection model based on algorithms or models that are applicable to historical sets of recurring data pipelines to determine which DQ constraints are indicative to DQ errors on a given recurring data pipeline. Upon training the pipeline error detection model, the data quality management system may automatically apply the pipeline error detection model in response to detecting each new execution of the recurring data pipeline in a way that the data of the new execution is verified with each execution. This can be applied to 10,000s of executions in a similar manner to effectively automate the verification of any number of recurring data pipelines in a very computationally efficient process.

In addition to automating the training and application of the pipeline error detection model, the data quality management system utilizes algorithms and metrics that are applicable to a wide range of recurring data pipelines. Indeed, by considering a collection of DQ constraints for a collection of diverse pipelines and then identifying a subset of the most relevant DQ constraints for a given recurring data pipeline, the data quality management system can create a customized error detection model that is applicable to each of the corresponding recurring data pipeline. As will be discussed in further detail herein, the training process may follow a uniform workflow to arrive at the customized program for detecting errors without requiring that an individual program a specific error detection program for each specific column of tens of thousands of recurring data pipelines. This uniform and automated approach provides a scalable training and implementation process that can be applied across each of any number of recurring data pipelines so long historical iterations of the pipelines is available to the data quality management system.

In addition to flexible applicability to a variety of different pipelines having different sizes and formats, features and functionality of the data quality management system described herein are similarly applicable to a wide variety of DQ error types. For example, where different recurring data pipelines have significantly different types of errors that may occur with respect to a given execution of a data pipeline, the data quality management system may consider these specific DQ constraints in determining the most relevant DQ constraints for the specific pipelines. Additional detail in connection with the different types of DQ constraints that are applicable to a variety of different recurring data pipelines will be discussed in further detail below in connection with various examples.

In addition to the enhanced flexibility and applicability of the data quality management system to a variety of recurring data pipelines, the data quality management system provides features that facilitate training of the pipeline error detection model using an offline process that does not interrupt normal operation of applications that make use of recurring data pipelines. For example, the data quality management system may train the pipeline error detection model using a robust training process and leveraging enhanced resources of a cloud computing system in a way that does not interrupt operations while utilizing a collection of recurring data pipelines.

In addition, once the pipeline error correction model is trained (offline), the data quality management system may apply the trained pipeline error detection model to current executions soon after the execution is made available using an online process. In this way, rather than retraining or further updating the pipeline error detection model while running an application that relies on the data from the data pipelines, the data quality management system may simply apply the trained pipeline error detection model as soon as the most recent execution of the recurring data pipeline is available without delay and without any user intervention (e.g., automatically upon detecting availability of the current pipeline execution). This offline training and online implementation allows for an immediate prediction of when a recurring data pipeline has potential DQ issues. Moreover, where a pipeline is frequently updating, this trained model can be applied with each updated execution with very little computational overhead.

Features and functionality of the data quality management system may additionally provide computational savings while achieving optimal predictions of DQ issues. For example, as will be discussed in further detail below, in the process of training the pipeline error detection model, the data quality management system may identify a subset of DQ constraints that satisfy a FPR budget while optimizing recall of DQ errors. In this manner, the data quality management system may find and apply a selective set of DQ constraints to a given pipeline execution that identifies the vast majority of recall errors while minimizing a number of false positive predictions of DQ errors within the recurring data pipeline. By fine-tuning this payoff between efficiency and accuracy, the data quality management system may provide a mechanism for identifying DQ issues without causing a significant number of false error predictions that an individual (e.g., administrator or owner of a particular pipeline) would have to investigate.

In one or more embodiments, the data quality management system may additionally be retrained over time to accommodate changing trends for a given recurring data pipeline. For example, after some threshold number of executions have been iterated for a recurring data pipeline, the data quality management system may fine-tune training of the pipeline error detection model in view of a recent set of executions without necessarily re-evaluating the entire history of the recurring data pipeline. In this way, the offline training process may be efficiently updated in a way that does not have to be redone from scratch on each iterative training of the pipeline error detection model.

As illustrated in the foregoing discussion, the present disclosure utilizes a variety of terms to describe features and advantages of the data quality management system. Additional detail will now be provided regarding the meaning of some of these terms.

For example, a "data pipeline" may refer to a source of data or reference to accessible data from which applications, processes, and other actions may draw from to perform various tasks or actions. In one or more embodiments, a data pipeline refers to a table or portion of a table or other accessible database of information from which a process can draw. In one or more embodiments described herein, a data pipeline refers specifically to a recurring data pipeline that is updated over time. For example, a recurring data pipeline may refer to a table or column of data (or reference(s) to other data) that is updated periodically (e.g., hourly, daily, weekly). It will be appreciated that data pipelines may include a variety of values and/or references to a variety of values, including numerical values, percentages, strings, locations, or any type of value that can be accessed and processed by an application or other processes.

As used herein, a "pipeline execution" or simply "execution" may refer to a specific instance of a recurring data pipeline. For example, as a recurring data pipeline is updated, each iteration of the update may refer to a pipeline execution. A current pipeline execution may refer to a most recent execution of a recurring data pipeline. A set of historical executions may refer to any number of previous iterations of a recurring data pipeline (which may include the current execution).

As used herein, a "data quality constraint" or "DQ constraint" may refer to a statistical measure that may be used to evaluate one or more values of a pipeline execution. A DQ constraint may refer to a range of metrics that may be expected or fall within a normal range of values for a given data pipeline and/or pipeline execution. As will be discussed in further detail herein, a DQ constraint may be classified as a statistical metric over a target column or pipeline and may include an upper and lower bound range of values. As will be discussed in further detail herein, the particular statistical metrics of the DQ constraints may refer to a wide variety of metrics that may be examined for determining (e.g., predicting) whether a given pipeline execution has DQ issues.

As used herein, a "DQ issue" or "DQ error" may refer to an instance of a recurring data pipeline within which data may not be accurate for some reason or another. In one or more embodiments described herein, a DQ error may refer to a prediction that one or more values of a given column or pipeline execution are incorrect or corrupted in some way. This may be caused as a result of an interdependency that has gone wrong or a change in data format, or a change in units, or any of a variety of potential issues that can cause the DQ error to occur.

As used herein, a "pipeline error detection model" refers to a model or program that has been trained or otherwise configured to predict that a DQ error has occurred within a given pipeline execution. In one or more embodiments described herein, a pipeline error detection model receives a pipeline execution as an input and generates an output including a prediction of whether the pipeline execution has one or more DQ errors therein. Additional detail describing features and functionality of the pipeline error detection model will be discussed in further detail below.

As used herein, an "false positive rate threshold" or simply "FPR threshold" may refer to a value indicating a number or percentage of false positives that a pipeline error detection model is configured to tolerate with respect to identifying DQ errors within pipelines executions for a recurring data pipeline. The FPR threshold may be configurable and applicable to DQ errors to be predicted across a corpus of recurring error pipelines. The FPR threshold may be a certain percentage of pipeline executions that an individual is willing to tolerate and review to ensure or otherwise verify accuracy of the pipeline error detection model. In one or more embodiments, the FPR may be modified to achieve higher recall (at the expense of more false positives) or to achieve fewer false positives (at a slight expense to error recall). In this way, the data quality management system is customizable to a variety of applications and preferences.

Additional detail will now be provided regarding a data quality management system in relation to illustrative figures portraying example implementations. For example, FIG. 1 illustrates an example environment 100 that includes a schematic diagram of a client device 102 having a pipeline data quality application 104 implemented thereon. The environment 100 further includes a server device(s) 106 having a data quality management system 108 thereon. The environment 100 may further include a third-party server device(s) 110 having a collection of data pipelines 112 (e.g., recurring data pipelines) thereon.

As shown in FIG. 1, the client device 102, server device(s) 106, and third-party server device(s) 110 may communicate with each other directly or indirectly through a network 126. The network 126 may include one or multiple networks and may use one or more communication platforms or technologies suitable for transmitting data. The network 126 may refer to any data link that enables the transport of electronic data between devices and/or modules of the environment 100. The network 126 may refer to a hardwired network, a wireless network, or a combination of hardwired and wireless networks. In one or more embodiments, the network 126 includes the Internet.

The client device 102 may refer to various types of computing devices. For example, the client device 102 may include a mobile device such as a mobile telephone, a smartphone, a PDA, a tablet, or a laptop. Additionally, or alternatively, the client device 102 may include a non-mobile device such as a desktop computer, server device, or other non-portable device. In addition, the server devices 106, 110 may similarly refer to various types of computing devices. Each of the client device 102 and server devices 106, 110 may include features and functionality described below in connection with FIG. 6.

As shown in FIG. 1, the client device 102 may optionally include a pipeline data quality application 104. The pipeline data quality application 104 may refer to any application or software product that enables the client device 102 to make use of or verify data pipelines. In one or more embodiments, the pipeline data quality application 104 is an application implemented locally on the client device 102. In one or more embodiments, the pipeline data quality application 104 refers to a browser or other application that allows the client device 102 to access one or more services of the data quality management system 108. For example, in one or more embodiments, the pipeline data quality application 104 simply refers to a local access point to features and functionalities described herein in connection with the data quality management system 108. Other implementations may refer to an application that includes plugins or internal features of the data quality management system 108.

Indeed, it will be appreciated that while FIG. 1 illustrates an example environment 100 in which the data quality management system 108 and associated components are implemented on a single server device, alternative implementations may involve one or more features or components of the data quality management system 108 implemented across multiple device including, for example, the client device 102. As an example, in one or more embodiments, the data quality management system 108 may implement features related to training pipeline error detection models 122 for a plurality of data pipelines 112 on the server device(s) 106. After training the models, the data quality management system 108 may provide one or more pipeline error detection models 122 to the client device 102 for local implementation thereon, such as in connection with the pipeline DQ application 104 when accessing a given data pipeline associated with a pipeline error detection model.

As further shown in FIG. 1, the third-party client device(s) 110 includes a collection of data pipelines 112. The data pipelines 112 may include any number of recurring data pipelines having a variety of values therein. As noted above, one or more embodiments of the data pipelines 112 may refer to tables or columns having a wide variety of values. For example, a data pipeline 112 may refer to a table of numerical values, percentage values, names, unique identifiers, or any other value that may be included within a cell of a column or table. As will be discussed below, each of the data pipelines 112 may have unique values and/or characteristics that may be leveraged to predict whether a DQ issue exists within a given data pipeline execution.

As will be discussed in further detail below, the data quality management system 108 may provide a variety of features related to training a pipeline error detection model that may be used in connection with predicting DQ errors within executions of a data pipeline (e.g., a recurring data pipeline). As shown in FIG. 1, the data quality management system 108 may include a pipeline manager 114 and a training manager 116 having a DQ constraint identifier 118 and a DQ constraint optimizer 120. The data quality management system 108 may train any number of pipeline error detection models 122 to be used in predicting various DQ issues within the data pipelines 112. Each of these components will be discussed in further detail below.

For example, the pipeline manager 114 may access the data pipelines 112 and provide access to the data pipelines 112 to the training manager 116 and/or pipeline error detection models 122 after training. In one or more embodiments, the pipeline manager 114 may provide access to a given data pipeline to the pipeline DQ application 104 on the client device 102. In some implementations, the pipeline manager 114 may detect new executions of data pipelines 112. In one or more embodiments, the pipeline manager 114 maintains a history of the data pipelines 112 to enable the training manager 116 to train the pipeline error detection models 122 in view of the historical iterations of the data pipelines 112.

As noted above, the training manager 116 may train any number of pipeline error detection models 122 to predict whether DQ issues exist within associated data pipelines 112. In one or more embodiments, the training manager 116 trains the pipeline error detection models 122 using a multi-step process that involves identifying DQ constraints for the collection of data pipelines 112. For example, the DQ constraint identifier 118 may construct a collection of DQ constraints for one or more data pipelines indicating statistical measures that are relevant to the set of one or more data pipelines.

In addition to constructing the collection of DQ constraints for the one or more data pipelines, the training manager 116 may further selectively determine which of the DQ constraints to include within a subset of DQ constraints that may be used to efficiently identify DQ issues with a low rate of false positives. For example, the DQ constraint optimizer 120 may determine tradeoffs between high recall for various DQ constraints and a rate at which using the specific DQ constraints will output false positives for a given data pipeline. Additional information in connection with training the pipeline error detection models 122 will be discussed below.

As shown in FIG. 1, the training manager 116 may train any number of pipeline error detection models 122. In one or more embodiments, the pipeline error detection models 122 includes a model for each of a plurality of data pipelines 112. In one or more embodiments, a pipeline error detection model is generated (e.g., trained) to predict DQ issues for a specific recurring data pipeline. In one or more embodiments, the pipeline error detection model is generated to predict DQ issues for a specific column within a recurring data pipeline. As will be discussed below, the pipeline error detection models can be trained and re-trained over time based on new executions being produced for the data pipelines 112. For example, a pipeline error detection model may be retrained or otherwise fine-tuned based on a predetermined number of pipeline executions being issued for a corresponding data pipeline.

As shown in FIG. 1, the server device(s) 106 may include a data storage 124 that provides access to different information. For example, as shown in FIG. 1, the data storage 124 may include pipeline data. The pipeline data may include any information associated with the data pipelines 112. For example, the pipeline data may include a history of values for the different pipeline execution. The pipeline data may include characteristics of the data including row counts, cell values, interdependencies with different data pipelines, etc. The pipeline data may include a schedule of executions, such as indicating a timing of when the data pipelines 112 are updated or refreshed. Indeed, the pipeline data may include any data usable by the DQ management system 108 to perform any of the features described herein.

As further shown, the data storage 124 may include DQ constraint data. The DQ constraint data may include any information about various DQ constraints that may be considered in creating a collection of candidate constraints for a given data pipeline as well as information that may be used in determining an optimized subset of DQ constraints that should be used in predicting DQ issues for a given data pipeline. By way of example, the DQ constraint data may include a listing of any number of statistical measures that may be considered for the data pipelines 112. The DQ constraint data may additionally include ranges of high and low values with respect to different data pipelines 112.

As further shown, the data storage 124 may include model data. The model data may include any information used in generating and training the pipeline error detection models. For example, in one or more embodiments, the model data may include an identification of any DQ constraints that are applicable for a given data pipeline based on characteristics of the pipeline and data therein. In addition, once trained, the model data may specifically indicate the subset of DQ constraints that should be considered for a data pipeline based on a tradeoff between recall and potential false positive predictions. The model data may further include an indication of a FPR parameter (e.g., a FPR budget) that was used in training a particular pipeline error detection model.

Additional information in connection with training an implementing the pipeline error detection models 122 to identify DQ issues within the data pipelines 112 will be discussed in connection further examples herein. For example, FIG. 2 illustrates an example workflow 200 showing an example implementation of the DQ management system 108 for training and implementing an example pipeline error detection model to predict whether DQ issues exist within a recurring data pipeline.

As shown in the example workflow 200, a collection of data pipelines 202 (e.g., recurring data pipelines) may be accessible to a pipeline manager 114. The pipeline manager 114 may obtain access to a history of executions for any number of the data pipelines 202. In one or more embodiments, the pipeline manager 114 accesses a history of a predetermined number of recent executions (e.g., thirty recent executions) for one or more of the data pipelines 202.

In one or more embodiments, the pipeline manager 114 additionally obtains error data for the data pipelines 202. For example, the pipeline manager 114 may identify which of the historical executions of the data pipelines 202 have certain DQ errors therein. This may be based on known iterations of the data pipelines 202 that have experienced errors, and may generally be referred to herein as ground truth data indicating whether a given execution has known instances of incorrect data therein.

Figure 2:
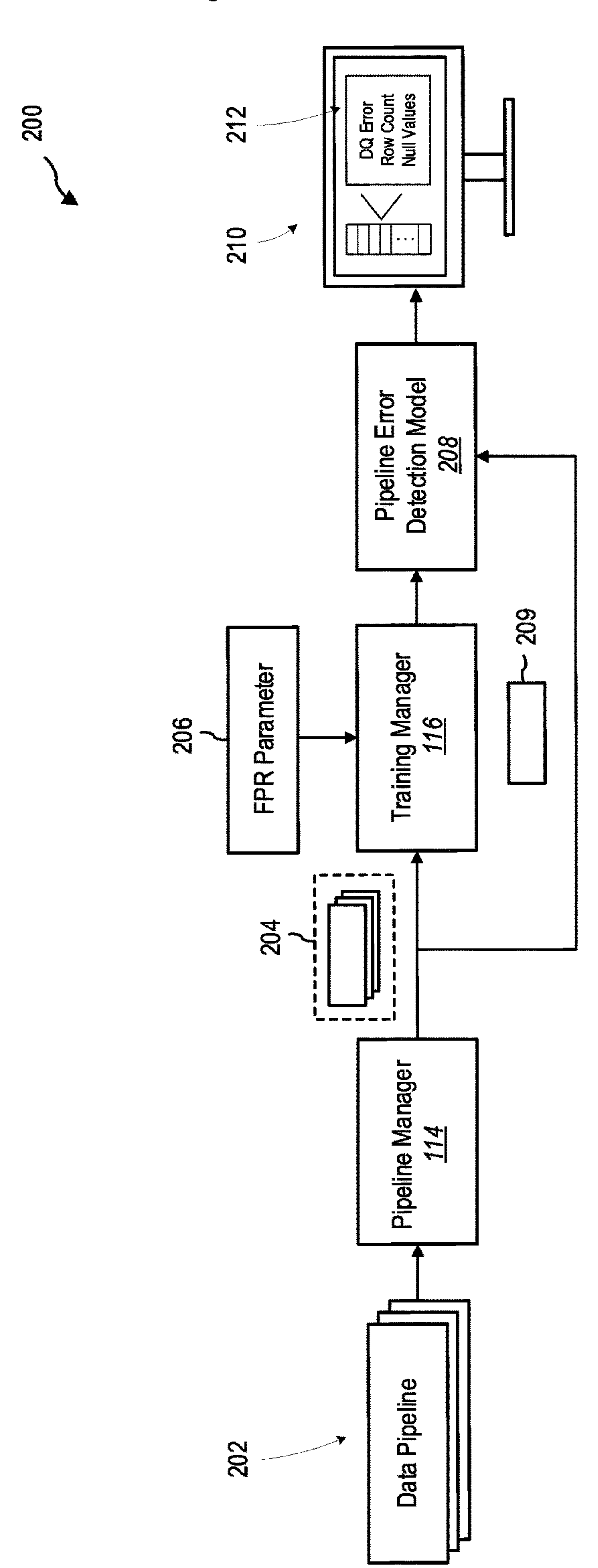
FIG. 2 illustrates an example workflow for training and implementing a pipeline error detection model in accordance with one or more embodiments.

In the example shown in FIG. 2, the pipeline manager 114 provides an example data pipeline history 204 for a given data pipeline to the training manager 116. The data pipeline history 204 may include any number of executions for a given data pipeline over some period of time. For example, the data pipeline history 204 may include a predetermined number of recent pipeline executions (e.g., thirty recent executions). In one or more embodiments, the pipeline manager 114 provides all of the pipeline executions from the data pipeline history 204 to the training manager 116. Alternatively, in one or more embodiments, the pipeline manager 114 simply provides a location or access to the data pipeline history 204 to the training manager 116.

While the data quality management system 108 may be used to train and implement any number of pipeline error detection models in connection with any recent execution of the plurality of data pipelines 202, FIG. 2 provides an example workflow 200 in which a specific data pipeline (e.g., corresponding to the data pipeline history 204) is considered for training a corresponding pipeline error detection model 208. Nevertheless, it will be appreciated that the training manager 116 may receive any number of data pipeline histories including any number of pipeline executions corresponding to additional data pipelines from the plurality of data pipelines 202.

In conjunction with receiving the pipeline history 204 for an example data pipeline, the training manager 116 may receive a false positive rate (FPR) parameter 206 to consider in training and tuning the algorithms that will be used to selectively identify DQ constraints and predict whether a DQ issue exists within a given execution of a data pipeline. As noted above, the FPR parameter 206 may refer to a default parameter that is applicable to training pipeline error detection models for each of the data pipelines 202. In one or more embodiments, the FPR parameter 206 is a configurable or user-selected value that can be chosen for some or all of the plurality of data pipelines 202. As a non-limiting example, the FPR parameter 206 may be selected as 0.1%, indicating a maximum allowable false positive rate (e.g., an FPR budget) of 0.1% in predicting DQ issues.

As will be discussed in further detail below, the training manager 116 may train the pipeline error detection model 208 to predict whether a DQ issue exists within a given execution of a data pipeline of interest (e.g., the data pipeline associated with the data pipeline history 204). In particular, the training manager 116 may train the pipeline error detection model 208 my first constructing a collection of DQ constraints for the recurring data pipeline. After constructing the set of DQ constraints, the training manager 116 may determine a subset of the DQ constraints that have an optimized rate of recall that stays within the budget set by the FPR parameter 206. Additional detail in connection with these stages of training the pipeline error detection model 208 will be discussed below with reference to examples shown in FIGS. 3A-3B.

Once trained, the pipeline error detection model 208 may be implemented or otherwise utilized to predict whether a DQ issue (or multiple DQ issues) exist within a given pipeline execution of the recurring data pipeline. For example, as shown in FIG. 2, after training the pipeline error detection model 208, the pipeline manager 114 can provide a current pipeline execution 209 (or any other recent execution of a data pipeline of interest in verifying the data therein) as an input to the pipeline error detection model 208. The pipeline error detection model 208 may be applied to the current pipeline execution 209 to determine whether the current execution 209 includes one or more DQ issues.

More specifically, pipeline error detection model 208 may be used to identify DQ issue(s) based on the subset of DQ constraints that were selectively determined for the pipeline error detection model 208. For example, where the training manager 116 identifies a first DQ constraint and a second DQ constraint as being highly indicative of DQ issues within a given execution for a data pipeline, the pipeline error detection model 208 may predict a DQ issue if values or characteristics of the current execution 209 fall outside the ranges of values indicated by the first DQ constraint and/or the second DQ constraint. Additional examples and more specific use-cases will be discussed below.

Upon determining a prediction of any DQ issues, the pipeline error detection model 208 may provide an output indicating the prediction of a DQ error (or lack thereof) to a computing device 210. While the computing device 210 may refer to any of a variety of computing devices (e.g., a server device, client device), in the example shown in FIG. 2, the indication of the prediction may be provided to any computing device 210 having a graphical user interface 212 thereon capable of providing a display of information related to the identified DQ issues.

As shown in FIG. 2, providing the output to the computing device 210 may cause the computing device 210 to present a DQ presentation via the graphical user interface 212 of the computing device 210. In particular, as shown in FIG. 2, the DQ presentation may include a display of data from the current execution 209. In addition, the DQ presentation may include an indication of any of the DQ constraints that were tagged or violated based on an analysis of the current execution 209 by the pipeline error detection model 208. More specifically, the DQ presentation may include an indication of one or more of the DQ constraints that were determined for the pipeline error detection model 208 as being most indicative of DQ issues within the data pipeline and which would not violate the FPR parameter 206.

This workflow 200 illustrates a series of acts for training the pipeline error detection model 208 in way that can be applied to each subsequent pipeline execution. This uniform training process can be performed to any number of data pipelines and can be automatically applied in response to each detected execution without any further training and without additional user input. Moreover, as discussed above and as shown in FIG. 2, the pipeline error detection model 208 may output information to provide a DQ presentation that includes not only an indication of potential DQ issues, but also includes an explanation of the DQ issues with respect to the current execution 209. Indeed, the DQ presentation may include an identification of any specific DQ issues as well as an indication of specific cells or characteristics of the current execution 209 that violate the associated DQ constraints. This allows the pipeline error detection model 208 to not only detect DQ issues in an automated way, but does so while ensuring a low FPR (e.g., based on the FPR parameter 206) and while maximizing a recall rate of potential DQ issues (as discussed in further detail below). This can significantly cut down on human intervention while very quickly and efficiently tagging predicting DQ issues with pipeline executions for a recurring data pipeline.

While FIG. 2 illustrates one example DQ presentation in which specific DQ constraints that are violated are indicated via the graphical user interface 212 of the computing device 210, other implementations may include additional features that explain or otherwise indicate the predicted DQ errors identified by the trained pipeline error detection model 208. For example, the presentation may indicate specific types of DQ errors (as shown), but also provide an indication to particular columns or data cells where the DQ constraints were violated (and were therefore responsible for the predicted errors). In one or more embodiments, the presentation may include a measure of certainty that the pipeline execution (or specific cells/rows/columns are in error) based on a scale with which the value(s) of the cells violated the DQ constraint. In one or more embodiments, the presentation may include an indication of both DQ constraints that are not violated in combination with DQ constraints that are violated. Indeed, the presentation may include any information to inform a user of the computing device 210 as to the type of DQ errors that are suspected within a given pipeline execution.

Figure 3A:
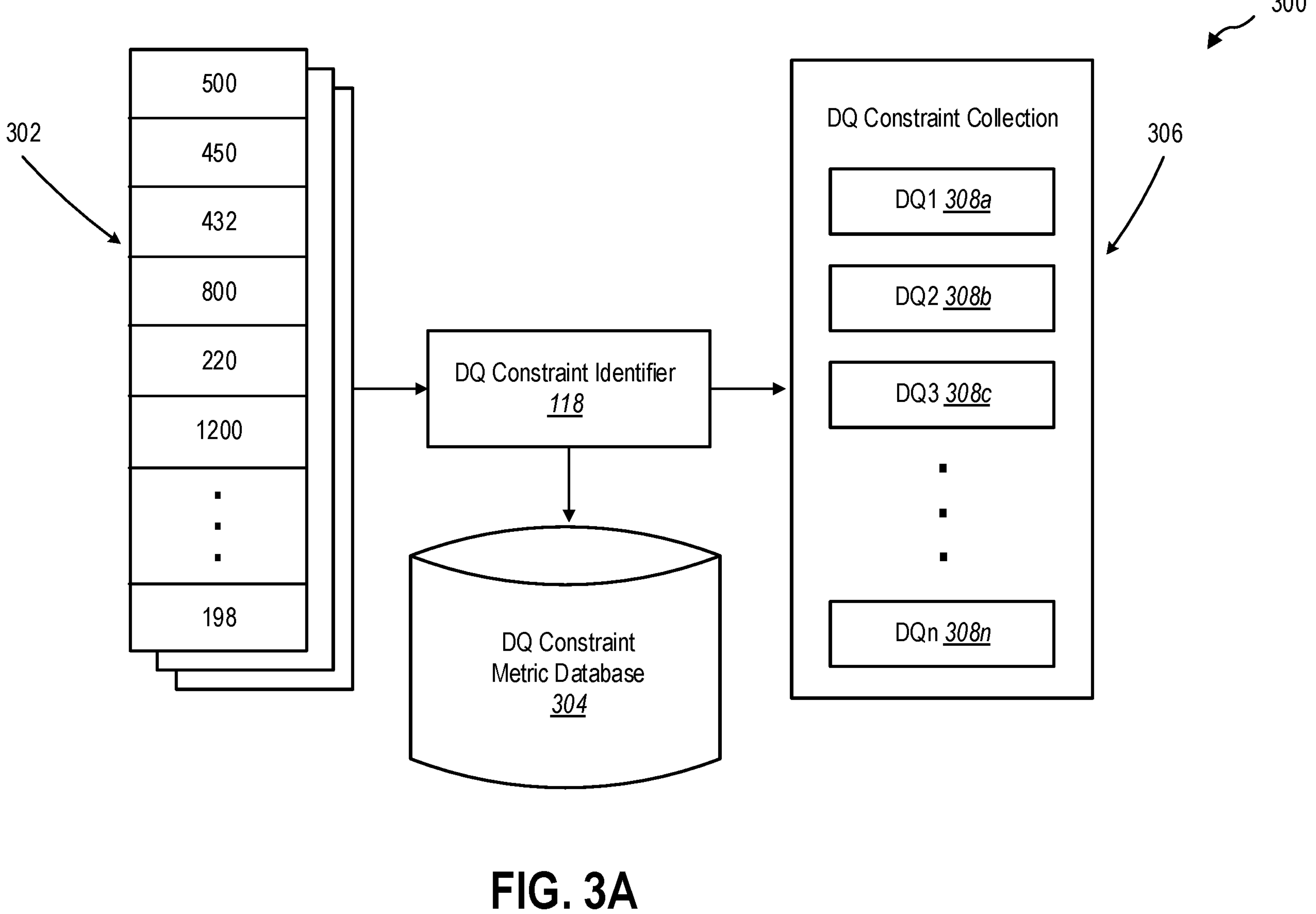
FIG. 3A illustrates an example implementation in which the data quality management system identifies a set of candidate data quality issues for a given data pipeline.
Figure 3B:
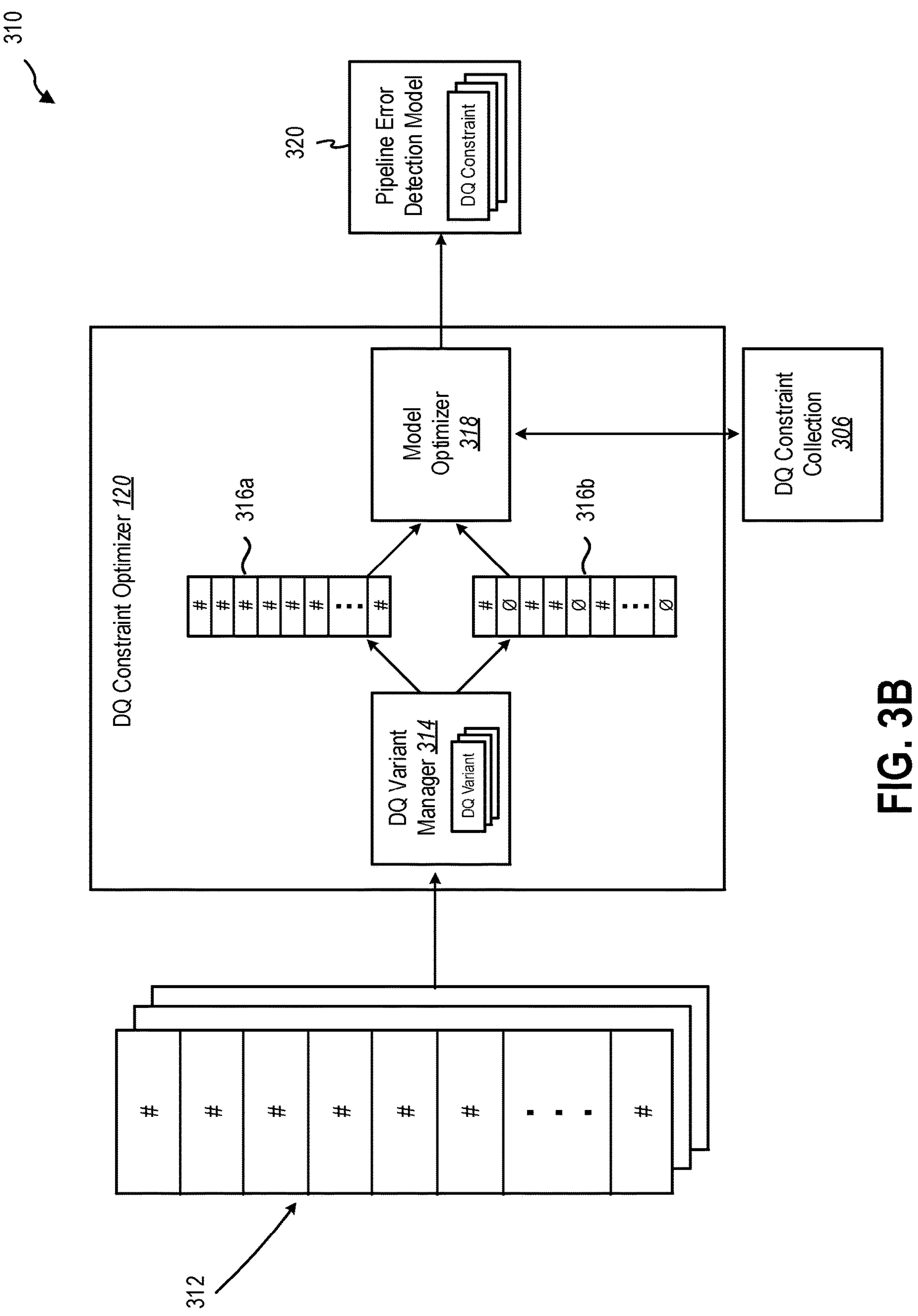
FIG. 3B illustrates an example implementation in which the data quality management system trains a pipeline error detection model to predict whether a data quality issue exists within a given recurring data pipeline.

As noted above, FIGS. 3A-3B provide example implementations involved in training a pipeline error detection model in accordance with one or more embodiments. In particular, FIG. 3A illustrates an example workflow 300 showing how a training manager 116 (e.g., a DQ constraint identifier 118 component of the training manager 116) can be used in generating a collection of DQ constraints for a recurring data pipeline. Further, FIG. 3B illustrates an example series of acts related to selectively identifying a subset of one or more DQ constraints from the compiled collection of DQ constraints to use in the pipeline error detection model. Additional detail in connection with FIGS. 3A and 3B will now be discussed below.

As just mentioned, FIG. 3A illustrates an example workflow 300 in which a DQ constraint identifier 118 is used to construct a collection of DQ constraints for a recurring data pipeline. As noted above, the DQ constraints may refer to statistical measures and associated ranges of values that may be considered in determining whether a given pipeline execution has potential DQ issues therein.

In the example shown in FIG. 3A, the DQ constraint identifier 118 may receive a set of historical pipeline executions 302 for a recurring data pipeline. The DQ constraint identifier 118 may then evaluate the values from the set of historical pipeline executions 302 to determine different ranges of values that correspond to distributions of values from the set of historical pipeline executions 302. The DQ constraint identifier 118 may determine ranges for any number of DQ constraints from a database of DQ constraint metrics. For example, the DQ constraint identifier 118 may draw from a set of known DQ constraints and, if applicable to a set of historical pipeline executions 302, may determine a range of values for the different DQ constraints that are reflected within the set of historical pipeline executions 302.

The DQ constraint identifier 118 can determine a range or distribution of values for any of a number of DQ constraints. As an illustrative example, the DQ constraint identifier 118 may identify a statistical metric of row counts from the DQ constraint metric database 304. The DQ constraint identifier 118 may then determine a distribution of row counts from the set of historical pipeline executions 302. Based on the distribution from the historical data, the DQ constraint identifier 118 may determine a probability of a given instanced of the dataset going outside a row count boundary range given a new instance (e.g., execution) of the dataset. Where the row counts are generally uniform (e.g., a data pipeline that typically has fifty rows), the DQ constraint identifier 118 may determine the range of values for the DQ constraint of row count to be very tight around a fifty row-count window. Thus, the DQ constraint identifier 118 may determine that a given instance of the dataset having a row count of less than or greater than 50 rows is associated with a high probability that the given instance has a DQ issue therein.

As another illustrative example, the DQ constraint identifier 118 may consider the values of cells within a table themselves and identify a statical metric of cell values from the DQ constraint metric database 304. The DQ constraint identifier 118 may then determine a distribution of cell values from the set of historical pipeline executions and determine a probability of a given instance going outside a particular range of values. In an example of a star rating where values are always between one and five, the DQ constraint identifier 118 may determine a distribution of values ranging from 1-5 and determine that a given instance of a dataset having cell values that fall outside of the 1-5 range have a high probability of DQ issues therein.

As shown by these examples, while the DQ constraint identifier 118 may consider a wide variety of DQ constraints associated with different statistical measures, the specific ranges of the DQ constraints may be individually determined for the specific data pipelines. For example, where a first pipeline may typically include a static number of rows with little to no variance (e.g., a 50 row table with values corresponding to specific states of the United States), a second pipeline may include a larger range of number of rows that vary from execution to execution (e.g., a number of reviews received for a movie over a range of time).

In these examples, the DQ constraint identifier 118 may determine a DQ constraint for the row count statistical measure of the respective pipelines, but may determine different ranges of values for the corresponding DQ constraints based on the probabilities associated with identifying DQ issues based on those specific DQ constraints. In addition, the specific probabilities of DQ issues associated with the different ranges may be significantly different for the respective DQ constraints from pipeline to pipeline (e.g., based on the different properties of the set of historical pipeline executions 302). Thus, it will be appreciated that while the DQ constraint identifier 118 may identify DQ constraints based on similar statistical measures for the different data pipelines, the specific ranges and probabilities will often be different based on the differences in distributions of values from the historical pipeline executions from the respective pipelines.

As shown in FIG. 3A, the DQ constraint identifier 118 may compile a DQ constraint collection 306 including a plurality of DQ constraints 308*a-n* that are applicable to the data pipeline associated with the historical pipeline executions 302. As will be discussed in further detail below, the compiled DQ constraints 308*a-n* may different in types of constraints as well as corresponding ranges and probabilities based on the statistical measures observed for the set of historical pipeline executions 302. Thus, it will be understood that the set of DQ constraints 308*a-n* represents a plurality of candidate constraints whose ranges and associated FPRs may be considered in determining whether DQ issues exist for the associated pipeline.

As mentioned above, the construction of the DQ constraint collection 306 may be performed as an offline process to avoid bogging down any applications that make use of the data pipelines. Indeed, as it would likely involve significant computing resources to extract a meaningful number of historical executions for tens-of-thousands of data pipelines and to then determine distributions for statistical measures for use in determining relevant DQ constraints, performing this as an offline process enables the data quality management system 108 to compile DQ construct collections for any number of data pipelines without interrupting applications that may make use of the data pipelines and would further enable the data quality management system 108 to leverage enhanced computing resources that are generally available to offline processes (e.g., cloud computing resources).

As noted above, the DQ constraint metric database 304 may include a wide variety of DQ types (e.g., types of statistical measures) to consider in creating the DQ constraints for the set of historical pipeline executions 302. In addition, the DQ constraint metric database 304 may include different statistical metrics to consider based on different properties of the respective data pipelines. Indeed, where a data pipeline includes numerical values, the DQ constraints identified by the DQ constraint identifier 118 may be different from DQ constraints identified where the data pipeline includes categorical data. In addition, the DQ constraints may include single or multi-distribution parameters, depending on whether a given execution has one or multiple distributions of values to consider.

By way of example, where a given data pipeline includes numerical values, the DQ constraint identifier 118 may determine DQ constraints based on statistical measures observed in a numerical column, such as a minimum value, a maximum value, an arithmetic mean, a median, a sum of values, a difference between maximum and minimum values, a number of rows, a fraction of unique values, and/or a fraction of complete (non-null) or null values. Additional DQ constraints may include multi-distribution constraints between numeric distributions, such as an earth movers distance (EMD), a Jensen-Shannon divergence, a Kullback-Leiber divergence, a two-sample Kolmogorov-Smirnov test, and a Cohen's d that quantify an effect size between numeric distributions.

Further by way of example, where a given data pipeline includes categorical values, the DQ constraint identifier 118 may determine DQ constraints based on statistical measures observed for a categorical column, such as an average length of strings, an average string length for values, an average number of digits in values, an average number of punctuation in values, a number of rows, a fraction of unique values, a fraction of complete (non-null values) or null values, and/or a number of distinct values. Additional DQ constraints may include multi-distribution constraints between categorical distributions, such as an L-1 distance, an L-infinity distance, a cosine difference, a chi-squared test using p-values, a Jensen-Shannon divergence, a Kullback-Leiber divergence, an/or any of the above multi-distribution constraint profiles extracted from two categorical distributions.

It will be understood that while some implementations of the data quality management system 108 may utilize a fixed set of statistical measures inclusive of those mentioned herein, the data quality management system 108 may use additional statistical measures not mentioned herein. For example, in one or more embodiments, the data quality management system 108 provides an extensible set of statistical measures such that the DQ constraints and resulting models may include additional statistical measures (or combinations of statistical measures) that are added to the DQ constraint collection 306 over time. Moreover, while one or more embodiments described herein specifically describe single-distribution statistical measures, one or more embodiments may additionally or alternatively consider multi-distribution statistical measures (e.g., two-distribution measures) in evaluating various columns and data pipelines.

As a more specific example related to the implementation illustrated in FIG. 3A, the data quality management system 108 may initiate compiling the DQ constraint collection 306 and their associated FPRs as a precursor to generating conjunctive programs for an auto-validation program. To initiate each DQ constraint, the data quality management system 108 first picks a metric (M) from a set of metrics (e.g., the DQ constraint metric database) to compute suitable upper and lower bound thresholds.

In particular, as discussed above, the data quality management system 108 may leverage a history of pipeline executions (e.g., columns from a history of pipeline executions) to obtain a relevant metric (M) for each of the pipeline executions. When applying the same metric (M) on a newly arrived batch of data from the pipeline, the resulting metric value can be seen as a data point drawn from a distribution. The data quality management system 108 may determine an estimated mean and variance of the distribution and construct a DQ constraint for a specific execution or column having an upper and lower bound range of values the follows the probabilistic FRP guarantees. In other words, and in accordance with embodiments described herein, the data quality management system 108 may determine properties of the distribution of values (e.g., upper threshold, lower threshold, mean, median, etc.) for the history of executions. The data quality management system 108 may maintain the DQ constraints having these values in the DQ constraint collection 306, as shown in FIG. 3A.

In one or more embodiments, the data quality management system 108 may determine alternative or tighter bound ranges of values for the various DQ constraints. For example, in one or more embodiments, the data quality management system 108 can instantiate an array of DQ constrains using the same metric (M), but with different upper and lower thresholds that correspond to different FPR guarantees. This can be effective for certain metrics that have a larger range of metric values that, while often less sensitive in catching DQ issues, may also provide a safer option with a lower FPR value, which may be considered by the DQ constraint optimizer 120 when determining a subset of DQ constraints to consider in training the pipeline error detection model(s). This bound may be derived using a variety of formulas, such as Cantanelli's inequality, a Central Limit Theorem, or other algorithms that allow the data quality management system 108 to consider different ranges of metric values without violating the FPR parameter.

While some DQ constraints may assume a history of metrics H(M) to be generated from a stationary process where a process with probability distributions that are generated from a stationary process having probability distributions that are static and do not change over time, there are certain data pipelines where historical metrics M(H) follow a non-stationary process. In these examples parameters of the underlying probability distribution may change over time.

For instance, where a data pipeline refers to website traffic data, this may change over time based on increasing or decreasing trends as well as day-to-day or intraday periodicity. To avoid setting ranges of metric values that are either too broad to be useful or that would violate the FPR parameter, the data quality management system 108 may apply time-series differencing on the history of metrics H(M) to reach stationarity. As an illustrative example, where a DQ metric refers to a row count, the Augmented Dickey-Fuller test may fail to reject the null hypothesis that M(H) is non-stationary. Applying a first order time-differencing step with t=1 may produce a time-differencing metric history $M'(H)=\{M(C_2)-M(C_1), M(C_3)-M(C_2), \ldots M(C_k)-M(C_{k-1})\}$ resulting in a metric history that passes the Augmented Dickey-Fuller test.

In one or more embodiments, the data quality management system 108 may apply other methods of seasonal differencing. For example, based on daily, weekly, or hourly patterns that may affect or otherwise correlate to different pipeline executions, the data quality management system 108 may apply a first-order single differencing function over the history of executions for the recurring data pipeline to use as a modified history of metrics.

As an example implementation, the data quality management system 108 may use the following algorithms to determine ranges and other parameters when compiling a listing of DQ constraints for a given history of pipeline executions:

Algorithm 1: Construct DQ constraints Q

```
Input :Metrics M, history H = {C1, C2, . . . } of col C
Output:Constructed DQ constraints Q
Q ← ∅
foreach M ϵ M do
| M(H) ← {M(C_1), M(C_2), . . . , M(C_K)}
| M(H) ← process-stationary(M(H))/ / Algorithm 2
| μ ← mean of M(H), σ^2 ← variance of M(H)
| foreach β ϵ [σ, nσ], increasing with a step-size s, do
|     |    Q_i ← Q(M, C, μ − β, μ + β)
|     |    FPR(Q_i) ← calc-FPR(M, β) / / Equation (5)-(7)
|     |    Q ← Q ∪ Q_i
return Q
```

where Q refers to a collection of DQ constraints, M refers to a metric from a set of metrics applicable to a given pipeline history (H), and where $C_n$ refers to a column of a particular pipeline execution. In this example, Algorithm 2 may refer to the following:

Algorithm 2: Time-series differencing for stationary

```
Input :M(H) = {M(C_1), M(C_2), . . . , M(C_K)}
Output:Processed M'(H) that is stationary
is_stationary ← ADF(M(H)) ; / / Perform ADF test
if is_stationary then
  |   return M(H)
else
  |   M'(H) ← time-series-differencing(M(H)) / / using
  |     first-order and seasonal differencing
  |   return M'(H)
```

Where M'(H) refers to a modified metric history based on properties of the time-series differencing between instances of the data pipeline (In this example, referring to the Augmented Dickey-Fuller (ADF) test.

FIG. 3B illustrates an example workflow 310 that involves training a pipeline error detection model to predict whether a DQ issue exists within a pipeline execution for a data pipeline. As shown in FIG. 3B, the DQ constraint optimizer 120 can receive a set of pipeline executions 312 to consider in training a pipeline error detection model 320. In one or more embodiments, the set of pipeline executions 312 refers to a history of pipeline executions for a pipeline of interest that the pipeline error detection model 320 is being trained for. Alternatively, in one or more embodiments, the set of pipeline executions 312 refers to a set of executions from different data pipelines. For example, the DQ constraint optimizer 120 may access data pipelines having similar types of values and statistical measures as a data pipeline of interest for which the DQ constraint optimizer 120 is training the pipeline error detection model 320.

As shown in FIG. 3B, the DQ constraint optimizer 120 may include a DQ variant manager 314 having access to a plurality of DQ variants to use as part of a process of synthetically training the pipeline error detection model 320. In particular, the DQ constraint optimizer 120 may access a plurality of known DQ variants associated with common DQ issues in data pipelines. Examples of the DQ variants may include schema changes, unit changes, increased nulls, and other variations that may be applied to a given pipeline execution to synthetically introduce DQ errors. The DQ constraints from the DQ constraint collection 306 may then be used to detect the errors and see how effective the different constraints are at identifying errors that are introduced to the pipeline execution.

As an illustrative example, FIG. 3B shows an example variant introduced to a pipeline execution. In the illustrated example, the DQ constraint optimizer 120 may introduce a DQ variant by modifying a number of null values to the pipeline execution. As shown in FIG. 3B, a first pipeline execution 316*a* may refer to the pipeline execution prior to applying the DQ variant while a second pipeline execution 316*b* refers to the modified pipeline execution as a result of applying the DQ variant.

In this example, the first pipeline execution 316*a* is presumed to have clean data that fits within the DQ constraints 308*a-n* from the DQ constraint collection 306. Accordingly, when applied to the first pipeline execution 316*a*, none of the DQ constraints 308*a-n* would return an error detection value associated with a detected DQ issue. Conversely, the second pipeline execution 316*b* would have incorrect null values and should be detected as having a DQ error. Accordingly, when applied to the second pipeline execution 316*b*, at least some of the DQ constraints 308*a-n* would hopefully return an error detection associated with a detected DQ issue.

In this example, the DQ constraint optimizer 120 applies any number of DQ variants to the example pipeline executions 312 and to systematically generate different versions of the pipeline executions having a variety of DQ issues introduced thereon. The DQ constraint optimizer 120 may then apply the DQ constraints 308*a-n* of the constructed DQ constraint collection 306 and determine which of the DQ constraints 308*a-n* provide a high recall rate (e.g., a high rate of identifying errors). Thus, the DQ constraint optimizer 120 may determine which of the DQ constraints have different rates of recall for a given data pipeline across the different DQ variants.

As shown in FIG. 3B, the DQ constraint optimizer 120 may include a model optimizer 318 for determining a subset of the DQ constraints 308*a-n* that has a high rate of recall while also staying within the FPR budget (as indicated by the FPR parameter). For example, the model optimizer 318 perform an optimization of the recall rates for the DQ constraints 308*a-n* from the DQ constraint collection 306 in combination with FPR rates previously determined for the DQ constraints 308*a-n*. The DQ constraint optimizer 120 may then compile a subset of DQ constraints that have a high recall rate and whose combined FPR does not exceed the FPR parameter previously received.

Considering the above, different data pipelines having different statistical characteristics will likely involve pipeline error detection models having different subsets of DQ constraints associated with different recall rates and different FPR values. For example, where a data pipeline includes a static measure such as a fixed number of rows for each execution, it would be understood that this likely has a very low FPR value, and even with a relatively low recall rate, this would be a very good DQ constraint to add to the subset of DQ constraints without incurring any sort of FPR penalty against the FPR budget. Other DQ constraints may have higher recall rates, but may also be associated with higher FPR values, and thus an optimization function would need to be applied to determine if the tradeoff is worth adding the associated DQ constraints to the subset of DQ constraints considered by the pipeline error detection model.

In one or more embodiments, the model optimizer 318 considers the tradeoff of recall rates and FPR values using the following algorithm:

Algorithm 3: Auto-Validate by-History (AVH)

input: Metrics M, a target-FPR $\delta$, column C, and its history $H = \{C_1, C_2, \ldots, C_K\}$
output: Conjunctive DQ Program P(S)
1 $Q \leftarrow$ Construct-Constraints(M, H) // Algorithm 1
2 $S \leftarrow \emptyset$, $FPR \leftarrow 0$
3 while $FPR \leq \delta$ do
4 | $Q_s = \arg\max_{Q_i \in Q}\left(\frac{\left|R(Q_i) \setminus \bigcup_{Q_j \in S} R(Q_j)\right|}{FRP(Q_i)}\right)$
5 | if $FPR(Q_s) + FPR \leq \delta$ then
6 | | $S \leftarrow S \cup Q_s$
7 | | $FPR \leftarrow FPR + FPR(Q_s)$
8 | $Q \leftarrow Q \setminus Q_s$
9 $Q_m = \arg\max_{Q_m \in Q}(|R(Q_m)|)$
10 if $|(\bigcup_{Q_i \in S} R(Q_i)| < |R(Q_m)|$ then
11 | $S \leftarrow \{Q_m\}$
12 return P(S)

where the target-FPR $\delta$ refers to an example FPR parameter, and where P(S) refers to a program having a solution based on a specific subset of DQ constraints determined to provide an optimal recall while staying within the budget indicated by the FPR parameter.

In one or more embodiments, the DQ constraint optimizer 120 considers the complimentary nature of the DQ constraints, such as when two different DQ constraints constantly overlap in detecting DQ issues. In this case, the DQ constraint optimizer 120 may selectively identify the DQ constraint that provides a higher contribution to the recall rate or which is has less overlap with another DQ constraint that, in combination, would provide a higher recall rate than the two DQ constraints that often overlap.

As shown in FIG. 3B, the DQ constraint optimizer 120 may generate a trained pipeline error detection model 320 for a specific data pipeline. The pipeline error detection model 320 will be trained to detect DQ issues within a pipeline execution for the data pipeline based on the identified subset of DQ constraints for which recall is optimized while staying within the indicated FPR budget.

Figure 4:
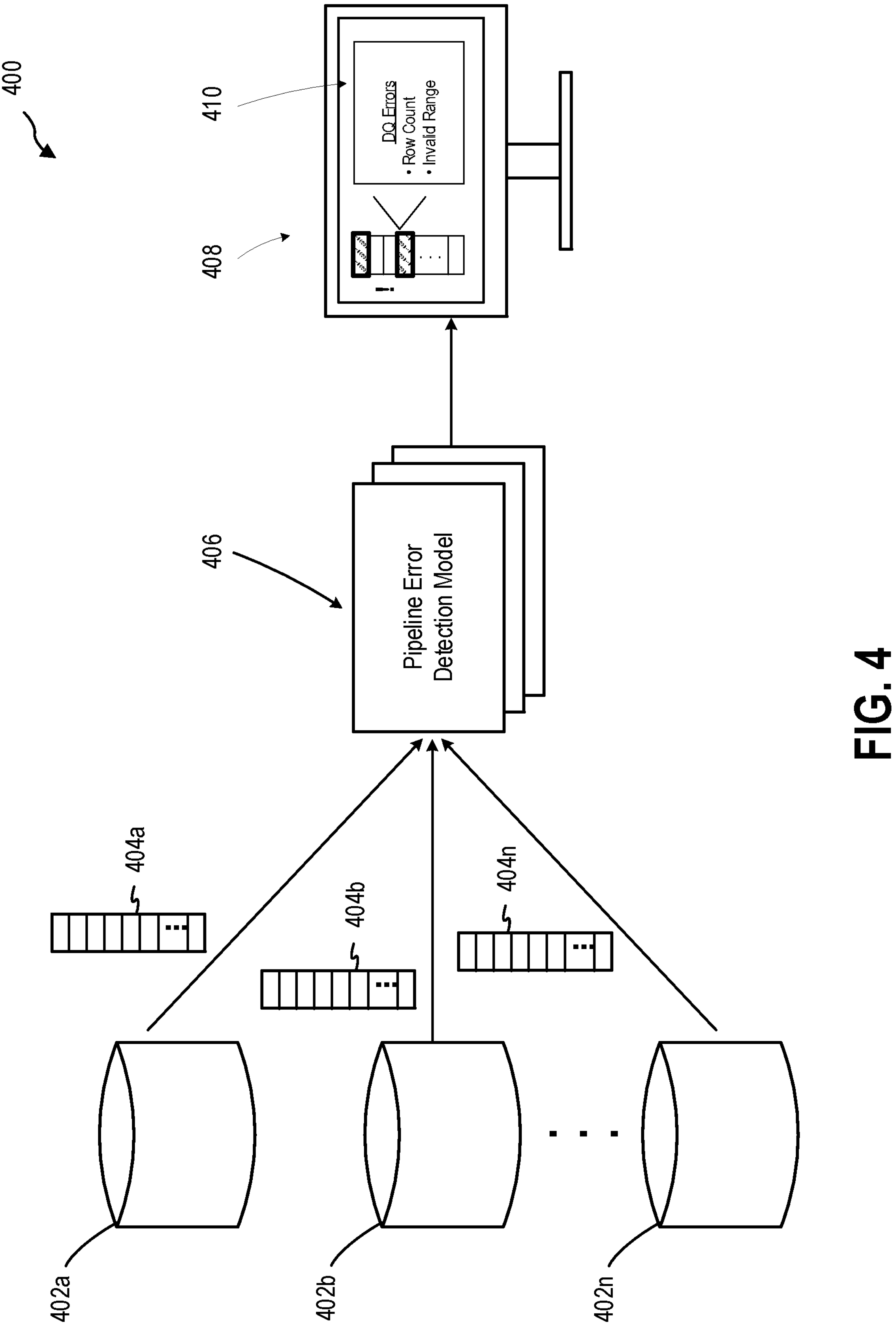
FIG. 4 illustrates an example implementation of the trained pipeline error detection model in accordance with one or more embodiments.

FIG. 4 illustrates an example workflow 400 showing implementation of a plurality of trained pipeline error detection models 406 that may be applied to corresponding data pipelines 402*a-n*. Each of these pipeline error detection models 406 may refer to a corresponding data pipeline similar to the example pipeline error detection model 320 just described in connection with FIGS. 3A-3B. For instance, in the example shown in FIG. 4, each of the plurality of pipeline error detection models 406 may correspond to an associated data pipeline 402*a-n* and may include a corresponding subset of DQ constraints that were previously determined to be applicable to the respective data pipelines 402*a-n*.

As shown in FIG. 4, each of the data pipelines 402*a-n* may provide pipeline executions 404*a-n* as inputs to the plurality of pipeline error detection models 406. For example, in response to receiving a first current pipeline execution 404*a* from a first data pipeline 402*a*, the data quality management system 108 may apply a first trained pipeline error detection model from the plurality of pipeline error detection models 406 that has been trained for the first data pipeline 402*a* in accordance with embodiments described herein.

The pipeline error detection model may output a prediction of whether DQ issues exist within the first current pipeline execution 404*a*. In particular, the pipeline error detection model for the first data pipeline 402*a* may apply the subset of DQ constraints that were determined to have a high recall for the first data pipeline 402*a* to the first current pipeline execution 404*a* and determine whether the first current pipeline execution 404*a* violates any of the ranges or values indicated by the subset of DQ constraints. If the first current pipeline execution 404*a* violates one or more of the DQ constraints, the pipeline error detection model may output a prediction that at least one DQ error exists within the first current pipeline execution 404*a*. Alternatively, if the first current pipeline execution 404*a* does not violate any of the DQ constraints, the pipeline error detection model may output a prediction that no DQ errors exist within the first current pipeline execution 404*a*.

As shown in FIG. 4, the pipeline error detection models 406 may provide outputs of predicted DQ issues to a computing device 408 having a graphical user interface 410 thereon. Providing the predicted DQ issues to the computing device 408 may cause the computing device 408 to provide a presentation of information associated with the DQ issues. The presentation of DQ issues may include similar features as discussed above in connection with FIG. 2.

Figure 5:
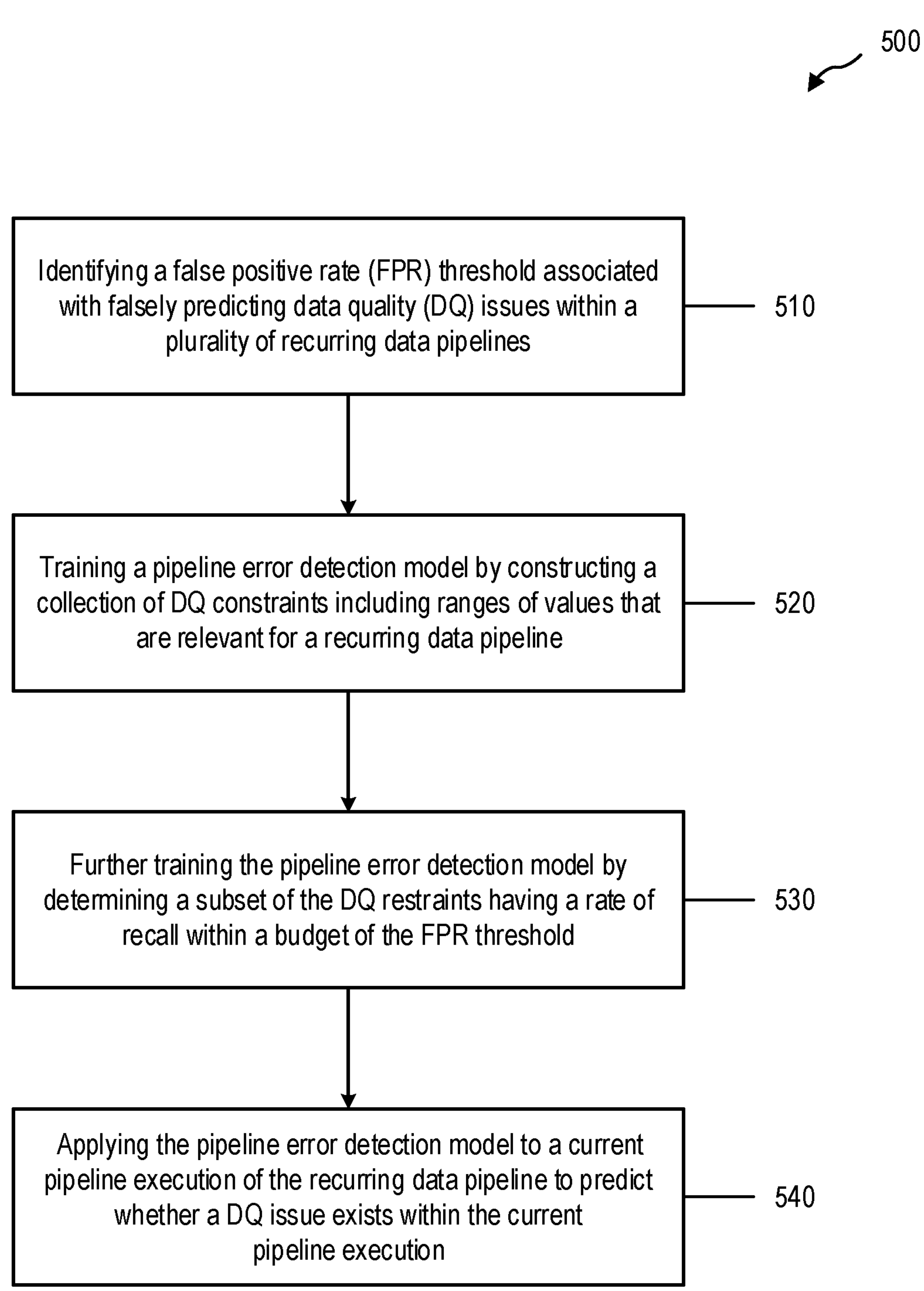
FIG. 5 illustrates an example method of training and implementing a pipeline error detection model in accordance with one or more embodiments.

Turning now to FIG. 5, this figure illustrates an example flowchart including a series of acts for training and implementing pipeline error detection models in connection with predicting DQ issues within recurring data pipelines. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

FIG. 5 illustrates an example series of acts 500 related to training and implementing pipeline error detection models in connection with predicting DQ issues within a recurring data pipeline. As shown in FIG. 5, the series of acts 500 includes an act 510 of identifying a false positive rate (FPR) threshold associated with falsely predicting data quality (DQ) issues within a plurality of recurring data pipelines. For instance, the act 510 may involve identifying a false positive rate (FPR) threshold associated with a rate of falsely predicting data quality (DQ) errors within a plurality of recurring data pipelines.

As further shown in FIG. 5, the series of acts 500 may include an act 520 of training a pipeline error detection model by constructing a collection of DQ constraints including ranges of values that are relevant for a recurring data pipeline. The series of acts 500 may further include an act 530 of further training the pipeline error detection model by determining a subset of the DQ restraints having a rate of recall within a budget of the FPR threshold. For example, in one or more embodiments, the acts 520-530 include training a pipeline error detection model to output a prediction indicating whether a given execution of a recurring data pipeline has a data quality (DQ) error. In one or more implementations, the act 520 involves constructing a collection of DQ constraints for the recurring data pipeline, the collection of DQ constraints indicating a plurality of statistical measures and associated ranges while the act 530 involves determining a subset of one or more DQ constraints from the collection of DQ constraints based on maximizing a rate of recall while staying within a budget of the FPR threshold.

As shown in FIG. 5, the series of acts 500 includes an act 540 of applying the pipeline error detection model to a current pipeline execution of the recurring data pipeline to predict whether a DQ issue exists within the current pipeline execution. For example, in one or more embodiments, the act 540 involves applying the pipeline error detection model to an execution of the recurring data pipeline to generate an output including a prediction of whether a DQ error exists within the execution of the recurring data pipeline.

In one or more embodiments, identifying the FPR threshold includes receiving a user-assigned FPR threshold for the plurality of recurring data pipelines. Alternatively, in one or more embodiments, identifying the FPR threshold includes identifying a default FPR threshold applicable to a given collection of recurring data pipelines. In one or more embodiments, the FPR threshold may be a different value for different recurring data pipelines.

In one or more embodiments, constructing the collection of DQ constraints includes determining, for a set of statistical measure from the plurality of statistical measures, corresponding ranges of values associated with predicting DQ errors within the recurring data pipeline and based on the FPR threshold. In one or more implementations, determining a given range of values includes determining whether an associated DQ constraint is generated from a stationary process or a non-stationary process. If the DQ constraint is generated from a stationary process, determining the range of values may include determining a lower bound and an upper bound value for the given range of values that is static and does not change over a history of executions for the recurring data pipeline. Alternatively, if the DQ constraint is generated from a non-stationary process, determining the range of values may include determining a lower bound and an upper bound value for the given range of values using a first-order time-differencing function over multiple executions of the recurring data pipeline.

In one or more embodiments, the execution of the recurring data pipeline includes a column of numerical values. In this example, the plurality of statistical measures may include two or more of a minimum value observed from the column, a maximum value observed from the column, an arithmetic mean observed from the column, a median value observed from the column, a number of rows of the column observed from the column, a fraction of unique values from the column, or a fraction of non-null values from the column.

In one or more embodiments, the execution of the recurring data pipeline includes a column of categorical values. In this example, the plurality of statistical measures may include two or more of an average length of strings observed from the column, an average string length for values observed from the column, an average number of digits in values observed from the column, an average number of punctuation in values observed from the column, a number of rows of the column observed from the column, a fraction of unique values from the column, or a fraction of non-null values from the column.

In one or more embodiments, determining the subset of the one or more DQ constraints includes iteratively applying DQ variants associated with respective DQ constraints from the collection of DQ constraints to historical executions of the recurring data pipeline. Determining the subset may further include identifying the subset of the one or more DQ constraints based on the one or more DQ constraints providing an optimized rate of recall for the historical executions of the recurring data pipeline while remaining within the budget of the FPR threshold.

In one or more embodiments, determining the subset of the one or more DQ constraints includes identifying a set of training data pipelines having similar features as the plurality of recurring data pipelines. In this example, determining the subset may involve iteratively applying DQ variants associated with respective DQ constraints from the collection of DQ constraints to the set of training data pipelines, and identifying the subset of the one or more DQ constraints based on the one or more DQ constraints providing a maximized rate of recall for the set of training data pipelines within the budget of the FPR threshold.

In one or more embodiments, training the pipeline error detection model is performed as an offline process. In one or more embodiments, execution of the recurring data pipeline is a most current version of the recurring data pipeline. In one or more embodiments, applying the pipeline error detection model is performed in response to detecting availability of the current execution of the recurring data pipeline.

In one or more embodiments, the series of acts 500 further includes generating presentation for the current execution of the recurring data pipeline, the presentation including an indication of a DQ failure and an indication of at least one DQ constraint from the subset of the one or more DQ constraints that was violated. In one or more embodiments, training the pipeline error detection model is based on a predetermined number of a recent history of executions for the recurring data pipeline.

Figure 6:
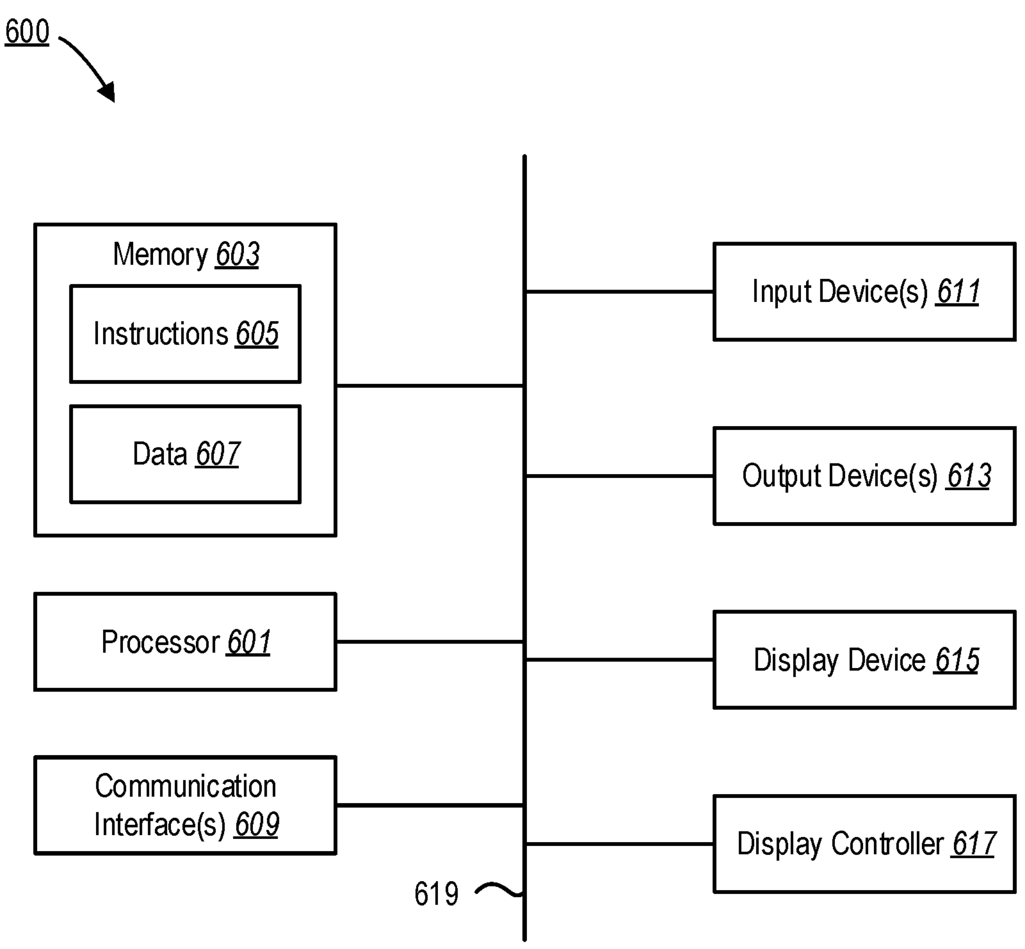
FIG. 6 certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method, comprising:

identifying a false positive rate (FPR) threshold associated with a rate of falsely predicting data quality (DQ) errors within a plurality of recurring data pipelines;

training a pipeline error detection model to output a prediction indicating whether a given execution of a recurring data pipeline has a data quality (DQ) error, wherein training the pipeline error detection model includes:

constructing a collection of DQ constraints for the recurring data pipeline, the collection of DQ constraints indicating a plurality of statistical measures and associated ranges;

identifying a set of training data pipelines having similar features as the plurality of recurring data pipelines; and iteratively applying DQ variants associated with respective DQ constraints from the collection of DQ constraints to the set of training data pipelines, the DQ variants comprising changes to one or more values of the set of training data pipelines;

determining a subset of DQ constraints from the collection of DQ constraints based on the one or more DQ constraints providing a maximized rate of recall while staying within a budget of the FPR threshold; and compiling the subset of DQ constraints within the trained pipeline error detection model such that when applied to the given execution of the recurring data pipeline, the pipeline-error detection model is configured to generate an output including a prediction of whether a DQ error exists within the given execution of the recurring data pipeline.

2. The computer-implemented method of claim 1, wherein identifying the FPR threshold includes one or more of:

receiving a user-assigned FPR threshold for the plurality of recurring data pipelines; or identifying a default FPR threshold applicable to a given collection of recurring data pipelines.

3. The computer-implemented method of claim 1, wherein constructing the collection of DQ constraints includes determining, for a set of statistical measure from the plurality of statistical measures, corresponding ranges of values associated with predicting DQ errors within the recurring data pipeline and based on the FPR threshold.

4. The computer-implemented method of claim 3, wherein determining a given range of values includes:

determining whether an associated DQ constraint is generated from a stationary process or a non-stationary process; and determining a lower bound and an upper bound value for the given range of values, wherein determining the lower bound and the upper bound value includes:

if the DQ constraint is generated from a stationary process, determining lower and upper bound values that are static and do not change over a history of executions for the recurring data pipeline; or if the DQ constraint is generated from a non-stationary process, determining lower and upper bound values using a first-order time-differencing function over multiple executions of the recurring data pipeline.

5. The computer-implemented method of claim 1, wherein the execution of the recurring data pipeline includes a column of numerical values, and wherein the plurality of statistical measures includes two or more of:

a minimum value observed from the column;

a maximum value observed from the column;

an arithmetic mean observed from the column;

a median value observed from the column;

a number of rows of the column observed from the column;

a fraction of unique values from the column; or a fraction of non-null values from the column.

6. The computer-implemented method of claim 1, wherein the execution of the recurring data pipeline includes a column of categorical values, and wherein the plurality of statistical measures includes two or more of:

an average length of strings observed from the column;

an average string length for values observed from the column;

an average number of digits in values observed from the column;

an average number of punctuation in values observed from the column;

a number of rows of the column observed from the column;

a fraction of unique values from the column; or a fraction of non-null values from the column.

7. The computer-implemented method of claim 1, wherein determining the subset of DQ constraints includes:

iteratively applying DQ variants associated with respective DQ constraints from the collection of DQ constraints to historical executions of the recurring data pipeline; and identifying the subset of DQ constraints based on the one or more DQ constraints providing the maximized rate of recall for the historical executions of the recurring data pipeline while remaining within the budget of the FPR threshold.

8. The computer-implemented method of claim 1, wherein training the pipeline error detection model is performed as an offline process.

9. The computer-implemented method of claim 8, further comprising causing the pipeline error detection model to be applied to an execution of the recurring data pipeline, wherein the execution of the recurring data pipeline is a most current version of the recurring data pipeline, and wherein applying the pipeline error detection model is performed in response to detecting availability of the most current execution of the recurring data pipeline.

10. The computer-implemented method of claim 9, further comprising generating a presentation for the execution of the recurring data pipeline, the presentation including an indication of a DQ failure and an indication of at least one DQ constraint from the subset of the DQ constraints that was violated.

11. The computer-implemented method of claim 1, wherein training the pipeline error detection model is based on a predetermined number of a recent history of executions for the recurring data pipeline.

12. A system, comprising:

at least one processor;

memory in electronic communication with the at least one processor;

instructions stored in the memory, the instructions being executable by the at least one processor to:

identify a false positive rate (FPR) threshold associated with a rate of falsely predicting data quality (DQ) errors within a plurality of recurring data pipelines;

train a pipeline error detection model to output a prediction indicating whether a given execution of a recurring data pipeline has a data quality (DQ) error, wherein training the pipeline error detection model includes:

constructing a collection of DQ constraints for the recurring data pipeline, the collection of DQ constraints indicating a plurality of statistical measures and associated ranges;

identifying a set of training data pipelines having similar features as the plurality of recurring data pipelines; and iteratively applying DQ variants associated with respective DQ constraints from the collection of DQ constraints to the set of training data pipelines, the DQ variants comprising changes to one or more values of the set of training data pipelines; and determining a subset of DQ constraints from the collection of DQ constraints based on the one or more DQ constraints providing a maximized rate of recall while staying within a budget of the FPR threshold; and compiling the subset of DQ constraints within the trained pipeline error detection model such that when applied to the given execution of the recurring data pipeline, the pipeline-error detection model is configured to generate an output including a prediction of whether a DQ error exists within the given execution of the recurring data pipeline.

13. The system of claim 12, wherein identifying the FPR threshold includes one or more of:

receiving a user-assigned FPR threshold for the plurality of recurring data pipelines; or identifying a default FPR threshold applicable to a given collection of recurring data pipelines.

14. The system of claim 12, wherein constructing the collection of DQ constraints includes determining, for a set of statistical measure from the plurality of statistical measures, corresponding ranges of values associated with predicting DQ errors within the recurring data pipeline and based on the FPR threshold.

15. The system of claim 14, wherein determining a given range of values includes:

determining whether an associated DQ constraint is generated from a stationary process or a non-stationary process; and determining a lower bound and an upper bound value for the given range of values, wherein determining the lower bound and the upper bound value includes:

if the DQ constraint is generated from a stationary process, determining lower and upper bound values that are static and do not change over a history of executions for the recurring data pipeline; or if the DQ constraint is generated from a non-stationary process, determining lower and upper bound values using a first-order time-differencing function over multiple executions of the recurring data pipeline.

16. The system of claim 12, wherein determining the subset of DQ constraints includes:

iteratively applying DQ variants associated with respective DQ constraints from the collection of DQ constraints to historical executions of the recurring data pipeline; and identifying the subset of DQ constraints based on the one or more DQ constraints providing the maximized rate of recall for the historical executions of the recurring data pipeline while remaining within the budget of the FPR threshold.

17. The system of claim 12, wherein training the pipeline error detection model is performed as an offline process.

18. A non-transitory computer readable media storing instructions thereon that, when executed by at least one processor, causes a computing device to:

identify a false positive rate (FPR) threshold associated with a rate of falsely predicting data quality (DQ) errors within a plurality of recurring data pipelines;

train a pipeline error detection model to output a prediction indicating whether a given execution of a recurring data pipeline has a data quality (DQ) error, wherein training the pipeline error detection model includes:

constructing a collection of DQ constraints for the recurring data pipeline, the collection of DQ constraints indicating a plurality of statistical measures and associated ranges;

identifying a set of training data pipelines having similar features as the plurality of recurring data pipelines; and iteratively applying DQ variants associated with respective DQ constraints from the collection of DQ constraints to the set of training data pipelines, the DQ variants comprising changes to one or more values of the set of training data pipelines;

determining a subset of DQ constraints from the collection of DQ constraints based on the one or more DQ constraints providing a maximized rate of recall while staying within a budget of the FPR threshold; and compiling the subset of DQ constraints within the trained pipeline error detection model such that when applied to the given execution of the recurring data pipeline, the pipeline-error detection model is configured to generate an output including a prediction of whether a DQ error exists within the given execution of the recurring data pipeline.

* * * * *